(12) United States Patent
Yoon (10) Patent No.: US 7,840,830 B2
(45) Date of Patent: Nov. 23, 2010

(54) SEMICONDUCTOR INTEGRATED CIRCUIT HAVING DATA INPUT APPARATUS AND METHOD OF INPUTTING DATA USING THE SAME

(75) Inventor: Sang-Sic Yoon, Gyeonggi-do (KR)

(73) Assignee: Hynix Semiconductor Inc. (KR)

( * ) Notice: Subject to any disclaimer, the term of this patent is extended or adjusted under 35 U.S.C. 154(b) by 1008 days.

(21) Appl. No.: 11/640,966

(22) Filed: Dec. 19, 2006

(65) Prior Publication Data

US 2007/0257717 A1    Nov. 8, 2007

(30) Foreign Application Priority Data

May 4, 2006    (KR) .................... 10-2006-0040632

(51) Int. Cl.
*G11C 7/10* (2006.01)
(52) U.S. Cl. ............. 713/500; 365/189.05; 365/189.17; 365/193; 365/194
(58) Field of Classification Search ................ 713/500; 365/189, 193, 194
See application file for complete search history.

(56) References Cited

U.S. PATENT DOCUMENTS

| | | | |
|---|---|---|---|
| 6,034,916 A * | 3/2000 | Lee ..................... | 365/233.12 |
| 6,096,968 A | 8/2000 | Schlosser et al. | |
| 6,314,050 B1 * | 11/2001 | Yi et al. ................ | 365/233.14 |
| 6,707,723 B2 * | 3/2004 | Jeong ................... | 365/189.05 |
| 6,728,144 B2 | 4/2004 | Nygren | |
| 7,016,256 B2 * | 3/2006 | Yoon et al. ............ | 365/189.16 |
| 7,020,031 B2 * | 3/2006 | Shin et al. ............. | 365/193 |
| 7,042,799 B2 * | 5/2006 | Cho ..................... | 365/185.17 |
| 7,050,352 B2 * | 5/2006 | Cha ..................... | 365/189.16 |
| 7,460,417 B2 * | 12/2008 | Kim et al. ............. | 365/193 |
| 2002/0041532 A1 * | 4/2002 | Watanabe et al. ...... | 365/219 |
| 2003/0086303 A1 * | 5/2003 | Jeong .................... | 365/189.05 |
| 2004/0213073 A1 * | 10/2004 | Yoon et al. ............ | 365/233 |
| 2004/0268028 A1 * | 12/2004 | Lee ...................... | 711/105 |
| 2005/0152209 A1 * | 7/2005 | Shin et al. ............. | 365/233 |

(Continued)

FOREIGN PATENT DOCUMENTS

JP    2006190433    7/2006

(Continued)

*Primary Examiner*—Thomas Lee
*Assistant Examiner*—Zahid Choudhury
(74) *Attorney, Agent, or Firm*—Venable LLP; Jeffri A. Kaminski; Todd R. Farnsworth (57) ABSTRACT

A data input apparatus includes: a phase detector comparing a phase of a data strobe signal with a phase of a clock signal to output a first phase comparison signal and a second phase comparison signal. A first delay controller determines whether a first data input strobe signal is delayed to output the determined signal as a second data input strobe signal in response to the first phase comparison signal. An internal clock synchronizer synchronizes first aligned data and second aligned data with the clock signal in response to the second data input strobe signal, to output the synchronized first and second data as first internal output data and second internal output data, respectively. A second delay controller determines whether the first internal output data and the second internal output data is delayed in response to the second phase comparison signal, to output the first internal output data and the second internal output data as first output data and second output data, respectively.

19 Claims, 9 Drawing Sheets

U.S. PATENT DOCUMENTS

2006/0203573 A1 * 9/2006 Kim et al. .................. 365/193

FOREIGN PATENT DOCUMENTS

| KR | 1020030037588 | 5/2003 |
| KR | 10-0403635 | 10/2003 |
| KR | 1020050101858 | 10/2005 |
| KR | 10-0543908 | 1/2006 |
| KR | 100559737 | 3/2006 |

* cited by examiner

PRIOR ART

FIG. 3

PRIOR ART

FIG. 4

PRIOR ART

PRIOR ART

SEMICONDUCTOR INTEGRATED CIRCUIT HAVING DATA INPUT APPARATUS AND METHOD OF INPUTTING DATA USING THE SAME

FIELD OF THE INVENTION

1. Technical Field

The present invention relates to a semiconductor integrated circuit having a data input apparatus and method of inputting data using the same, and more particularly, to a semiconductor integrated circuit having a data input apparatus and method of inputting data using the same, which improves a skew margin of a data strobe signal and a main clock signal of the semiconductor memory integrated circuit.

2. Related Art

Figure 1:
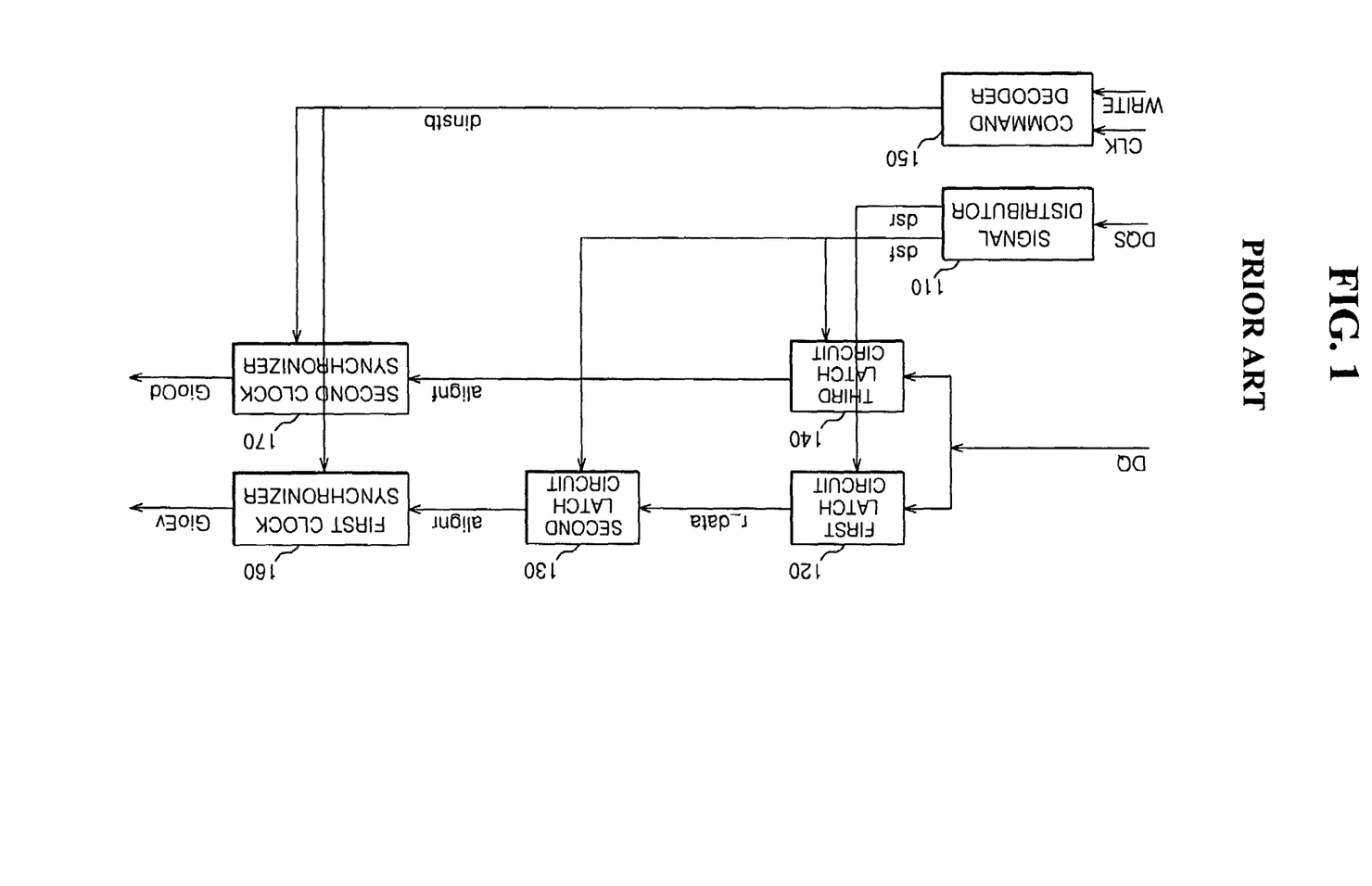
FIG. 1 is a circuit diagram of a conventional data input apparatus of a semiconductor integrated circuit.

A general data input and output apparatus of a semiconductor integrated circuit, as shown in FIG. 1, includes a signal distributor 110, a first latch circuit 120, a second latch circuit 130, a third latch circuit 140, a command decoder 150, a first clock synchronizer 160, and a second clock synchronizer 170.

The signal distributor 110 receives a data strobe signal DQS to output a first latch signal dsr and a second latch signal dsf.

The first latch circuit 120 latches input data DQ in response to the first latch signal dsr to output rising, data r_data.

The second latch circuit 130 latches the rising data r_data in response to the second latch signal dsf to output first aligned data alignr.

The third latch circuit 140 latches the input data DQ in response to the second latch signal dsf to output second aligned data alignf.

The command decoder 150 receives a clock signal CLK and a write command signal WRITE to generate and output a data input strobe signal dinstb.

The first clock synchronizer 160 receives the first aligned data alignr and the data input strobe signal dinstb to generate and output first output data GioEv. That is, the first clock synchronizer 160 latches the first aligned data alignr in response to the data input strobe signal dinstb, thereby generating the first output data GioEv controlled by the clock signal CLK.

In addition, the second clock synchronizer 170 receives the second aligned data alignf and the data input strobe signal dinstb to output second output data GioOd. That is, the second clock synchronizer 170 latches the second aligned data alignf in response to the data input strobe signal dinstb to generate the second output data controlled by the clock signal CLK.

In this case, the write command signal WRITE is synchronized with the clock signal CLK, and the input data DQ are synchronized with the data strobe signal DQS. In addition, the first latch signal dsr is a pulse signal which is inverted to a high level at the rising edge of the data strobe signal DQS. The second latch signal dsr is a pulse signal which is inverted to a high level at the falling edge of the data strobe signal DQS.

A conventional data input apparatus of a semiconductor integrated circuit uses, as an input, the input data DQ synchronized with the data strobe signal DQS. Accordingly, the data input apparatus of the semiconductor integrated circuit outputs first output data GioEv and second output data GioOd which are controlled by the clock signal CLK.

Figure 2:
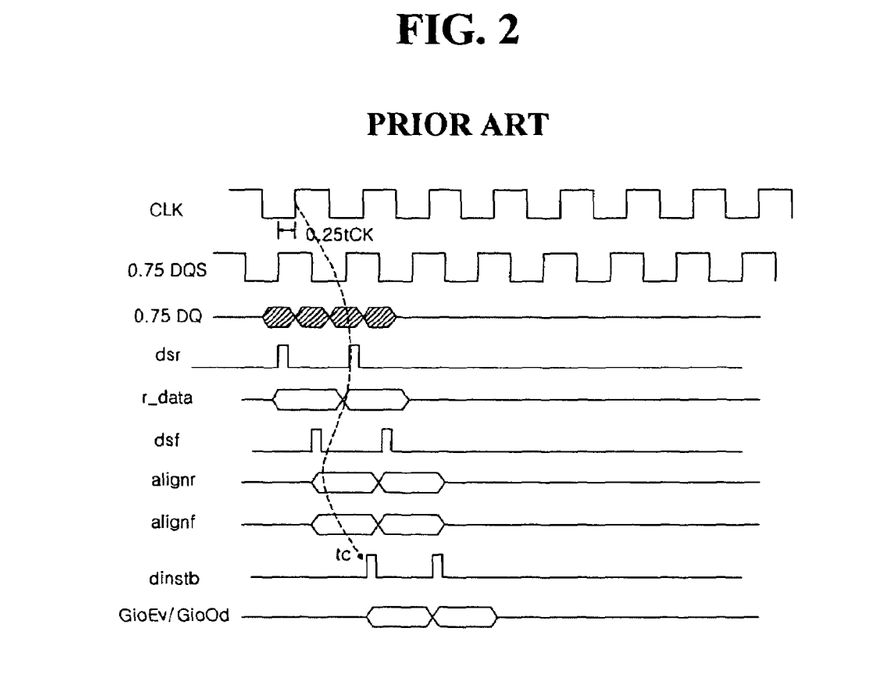
FIG. 2 is a timing diagram illustrating the case that the data strobe signal leads the clock signal in the data input apparatus of FIG. 1.

FIG. 2 is a timing diagram illustrating the case that the data strobe signal leads the clock signal in the data input apparatus of FIG. 1.

As shown in FIG. 2, when the data strobe signal DQS leads the clock signal by 0.25tCK, the input data DQ synchronized by the data strobe signal DQS are latched to rising data r_data at the rising edge of the data strobe signal DQS by the first latch signal dsr of the first latch circuit 120. In addition, the first aligned data alignr are obtained by aligning the rising data r_data by means of the second latch signal dsf of the second latch circuit 130. In addition, the second aligned data alignf is output by latching and aligning the input data DQ at the falling edge of the data strobe signal DQS by means of the second latch signal dsf of the third latch circuit 140. That is, the first and second aligned data alignr and alignf are generated at the same timing by the second latch signal dsf.

In addition, since the data strobe signal DQS leads the clock signal CLK, the first aligned data alignr and the second aligned data alignf are synchronized by the clock signal, and are generated leading the data input strobe signal dinstb with a predetermined delay tc.

Figure 3:
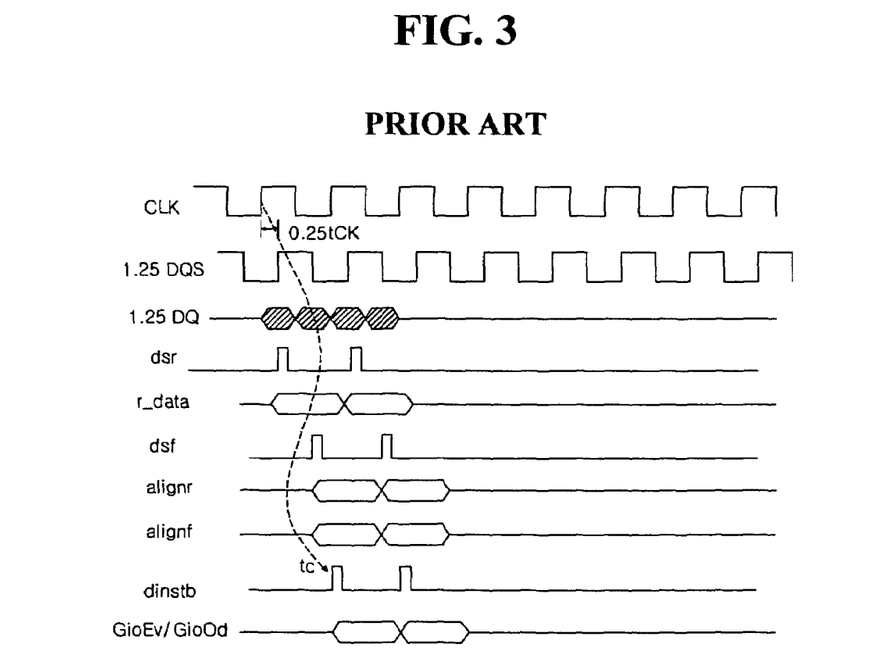
FIG. 3 is a timing diagram illustrating the case that the clock signal precedes the data strobe signal in the data input apparatus of FIG. 1.

FIG. 3 is a timing diagram illustrating the case that the clock signal leads the data strobe signal in the data input apparatus of FIG. 1.

First aligned data alignr and second aligned data alignf shown in FIG. 3 are generated by the same method as that of generating the first aligned data alignr and the second aligned data alignf shown in FIG. 2. The timing of generating the first aligned data alignr and the second aligned data alignf shown in FIG. 3 is a little later than the timing shown in FIG. 2.

That is, referring to FIG. 3, since the clock signal CLK leads of the data strobe signal DQS, the first aligned data alignr and the second aligned data alignf are synchronized with the clock signal CLK, and are generated lagging behind the data input strobe signal dinstb with a predetermined delay tc.

Figure 4:
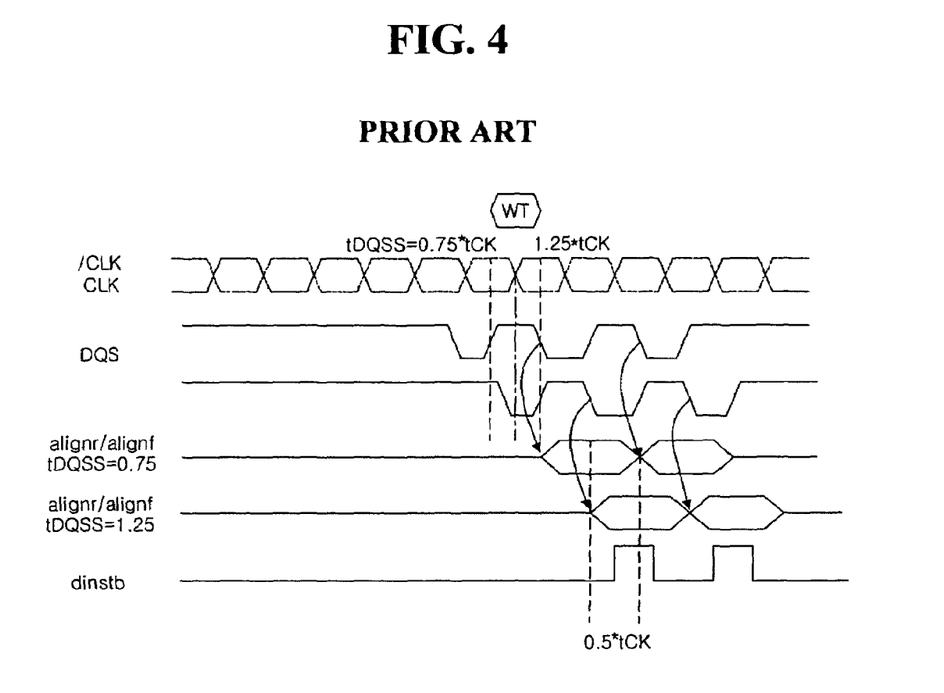
FIG. 4 is a timing diagram illustrating a tDQSS margin of a conventional data input apparatus.

FIG. 4 is a timing diagram illustrating a tDQSS margin of a conventional data input apparatus.

Referring to FIG. 4, it is assumed that a write command signal WRITE, i.e., WT is input along with input data DQ. Accordingly, the data input strobe signal dinstb is delayed by a predetermined time tc and generated after the rising edge of the clock signal CLK. However, the first aligned data alignr and the second aligned data alignf are generated at the fastest timing or the latest timing in accordance with a skew specification of the data strobe signal DQS and the clock signal CLK, so that an overlapping portion between the first aligned data alignr and the second aligned data alignf becomes an internal margin of a chip with respect to tDQSS.

The tDQSS has a skew of ±0.25tCK of the data strobe signal DQS and the clock signal CLK of the system when one period of the clock signal CLK is 1tCK.

When the data strobe signal DQS leads the clock signal CLK by 0.25tCK (tDQSS=0.75) and when the clock signal CLK leads the data strobe signal DQS by 0.25tCK (tDQSS=1.25), an overlapping portion between the first aligned data alignr and the second aligned data alignf is 0.5tCK for each case. Accordingly, 0.5tCK becomes the internal margin. When it is assumed that the data input strobe signal dinstb causes latching in the central portion of the internal margin, the data input strobe signal has the tDQSS margin of ±0.25tCK.

However, when the internal margin of tDQSS is not secured, operational stability of a high speed interface circuit using the data strobe signal DQS as a strobe signal dedicated for the input data can not be secured. Accordingly, there arises a problem in development of the memory apparatus requiring high speed operations.

SUMMARY OF THE INVENTION

Embodiments of the present invention provide a semiconductor integrated circuit having a data input apparatus which can secure a signal margin.

Another embodiment of the present invention provides a method of inputting data in a semiconductor integrated circuit, which can improve a tDQSS margin by comparing a phase of a data strobe signal with a phase of a clock signal, separating the case of having the data strobe signal leading ahead of the clock signal from the case of having the clock signal leading ahead of the data strobe signal and carrying out respective operations thereof.

An embodiment of the present invention provides a semiconductor integrated circuit having a data input apparatus, comprising: a phase detector comparing a phase of a data strobe signal with a phase of a clock signal to output a first phase comparison signal and a second phase comparison signal; a first delay controller determining whether a first data input strobe signal is delayed to output the determined signal as a second data input strobe signal in response to the first phase comparison signal; an internal clock synchronizer synchronizing first aligned data and second aligned data with the clock signal in response to the second data input strobe signal to output the synchronized first and second data as first internal output data and second internal output data, respectively; and a second delay controller determining whether the first internal output data and the second internal output data is delayed in response to the second phase comparison signal, to output the first internal output data and the second internal output data as first output data and second output data, respectively.

When the phase of the clock signal leads the phase of the data strobe signal, the first data input strobe signal may be delayed by a predetermined time by the first delay controller and the first and second internal output data may not be delayed by the second delay controller, and when the phase of the data strobe signal leads the phase of the clock signal, the first data input strobe signal may not be delayed by the first delay controller and the first and second internal output data may be delayed by the predetermined time by the second delay controller.

In addition, the semiconductor integrated circuit may further comprise an aligned data generator receiving input data and the data strobe signal, and outputting the first aligned data and the second aligned data; and a command decoder receiving the clock signal and a write command signal, and outputting the first data input strobe signal.

Another embodiment of the present invention provides a method of inputting data in a semiconductor memory, which latches and aligns input data and outputs first and second aligned data in response to a first latch signal and a second latch signal synchronized with a data strobe signal, and outputs the first and second aligned data as first and second output data synchronized with the clock signal in response to a data input strobe signal output by decoding a clock signal and a write command signal, the method comprising: providing a first latch signal and a second latch signal synchronized with a data strobe signal, and providing a first data input strobe signal by decoding a clock signal and a write command signal; generating first aligned data and second aligned data in response to the first latch signal and the second latch signal; comparing a phase of the data strobe signal with a phase of the clock signal, and outputting a first phase comparison signal and a second phase comparison signal; determining whether the first data input strobe signal is delayed in response to the first phase comparison signal resulting from the data strobe signal and the clock signal, and outputting the first data input strobe signal as a second data input strobe signal; outputting the first aligned data and the second aligned data as first internal output data and second internal output data synchronized with the clock signal in response to the second data input strobe signal; and determining whether the first internal output data and the second internal output data are delayed in response to the second phase comparison signal, and outputting the first and second internal output data as the first output data and the second output data, respectively.

A further understanding of the nature and advantages of the present invention may be realized by reference to the remaining portions of the specification and the attached drawings.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified. In the figures.

DETAILED DESCRIPTION OF EXEMPLARY EMBODIMENT

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout the accompanying figures.

Figure 5:
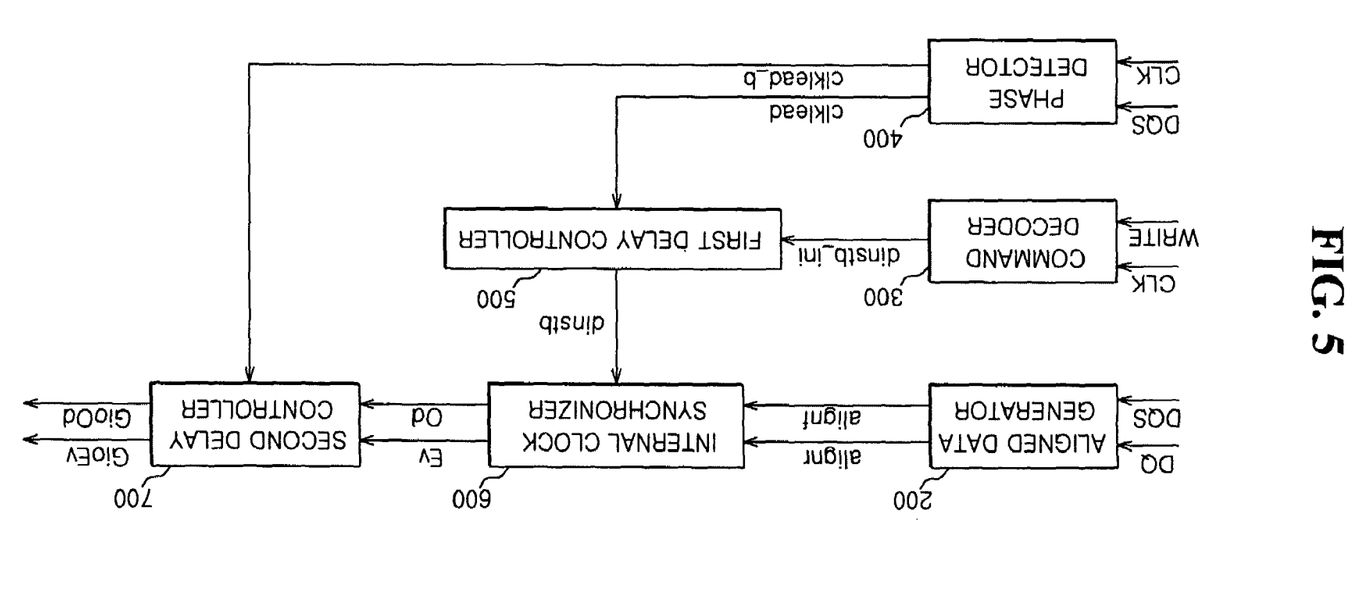
FIG. 5 is a block diagram of a data input apparatus of a semiconductor integrated circuit in accordance with an embodiment the present invention.

Referring to FIG. 5, a data input apparatus of a semiconductor integrated circuit may include an aligned data generator 200, a command decoder 300, a phase detector 400, a first delay controller 500, an internal clock synchronizer 600, and a second delay controller 700.

Figure 6:
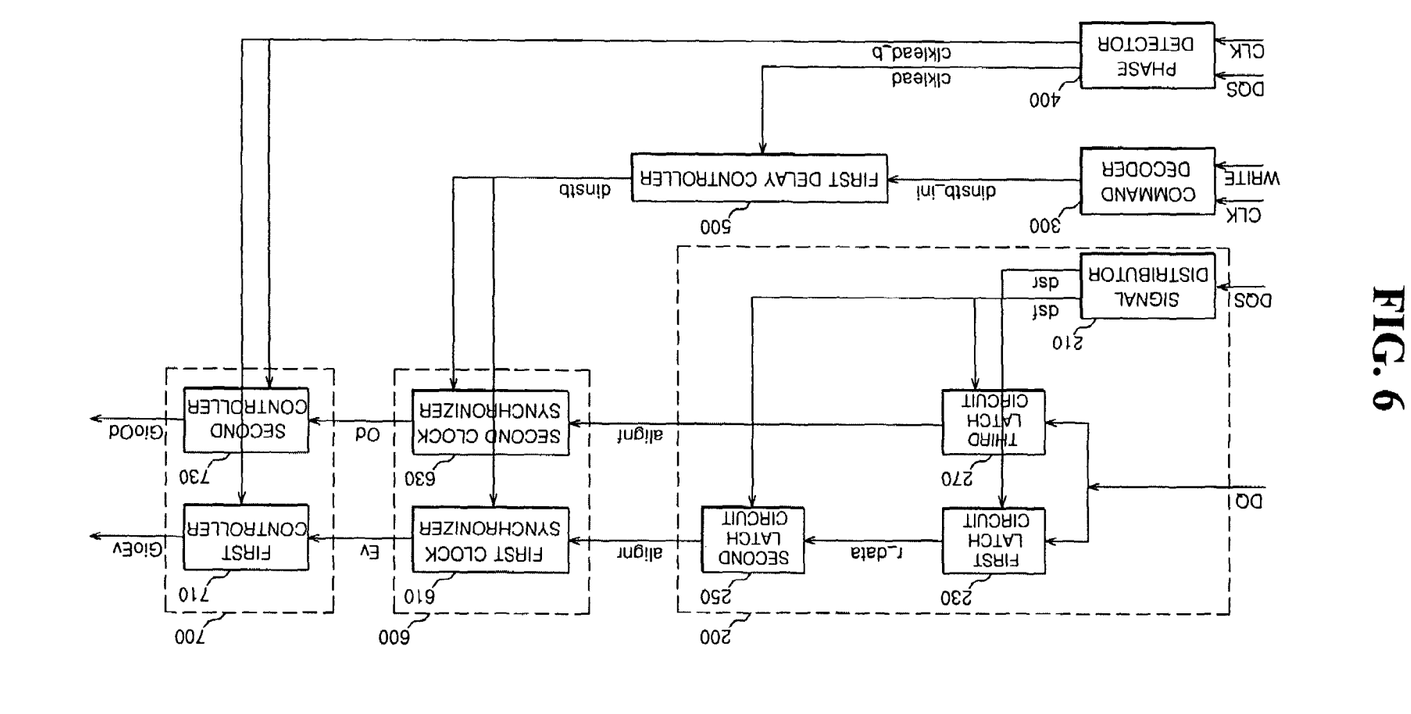
FIG. 6 is a detailed block diagram of the data input apparatus of FIG. 5.

The aligned data generator 200 receives input data DQ and a data strobe signal DQS to output a first aligned data alignr and a second aligned data alignf. This aligned data generator 200, as shown in FIG. 6, may include a signal distributor 210 receiving the data strobe signal DQS as an input to output a first latch signal dsr and a second latch signal dsf; a first latch circuit 230 latching the input data DQ in response to the first latch signal dsr to output rising data r_data; a second latch circuit 250 aligning the rising data r_data in response to the second latch signal dsf to output the first aligned data alignr, and a third latch circuit 270 latching and aligning the input data DQ in response to the second latch signal dsf to output the second aligned data alignf.

The command decoder 300 receives the clock signal CLK and the write command signal WRITE to output a first data input strobe signal dinstb_ini.

The phase detector 400 compares the phase of the data strobe signal DQS with the phase of the clock signal CLK to output a first phase comparison signal clklead and a second phase comparison signal clklead_b.

The first delay controller 500 determines whether the first data input strobe signal dinstb_ini is delayed in response to the first phase comparison signal clklead, to output the determined signal as a second data input strobe signal dinstb. A detailed structure of the first delay controller 500 will be described later.

The internal clock synchronizer 600 synchronizes the first aligned data alignr and the second aligned data alignf with the clock signal CLK in response to the second data input strobe signal dinstb. The internal clock synchronizer 600 outputs the first aligned data alignr and the second aligned data alignf synchronized with the clock signal CLK as first internal output data Ev and second internal output data Od, respectively. Such an internal clock synchronizer 600 may include a first clock synchronizer 610 synchronizing the first aligned data alignr with the clock signal CLK in response to the second data input strobe signal dinstb to output it as the first internal output data Ev, and a second clock synchronizer 630 synchronizing the second aligned data alignf with the clock signal CLK in response to the second data input strobe signal dinstb to output it as the second internal output data Od.

The second delay controller 700 determines whether the first internal output data Ev and the second internal output data Od are delayed in response to the second phase comparison signal clklead_b, and outputs first output data GioEv and second output data GioOd. Such a second delay controller 700 may include a first controller 710 determining whether the first internal output data Ev is delayed in response to the second phase comparison signal clklead_b and outputting the determined signal as the first output data GioEv, and a second controller 730 determining whether the second internal output data Od is delayed in response to the second phase comparison signal clklead_b and outputting the determined signal as the second output data GioOd.

The write command signal WRITE is synchronized with the clock signal, and the input data DQ is synchronized with the data strobe signal DQS. The first phase sensing signal clklead and the second phase sensing signal clklead_b have opposite levels with respect to each other. An exemplary embodiment of the present invention will be described referring to the case that the first phase sensing signal clklead becomes a high level when the clock signal CLK leads the data strobe signal DQS, and becomes a low level when data strobe signal DQS leads the clock signal. In addition, the first data latch signal dsr is a pulse signal inverted to a high level at the rising edge of the data strobe signal DQS, and the second data latch signal dsf is a pulse signal inverted to a high level at the falling edge of the data strobe signal DQS.

Figure 7:
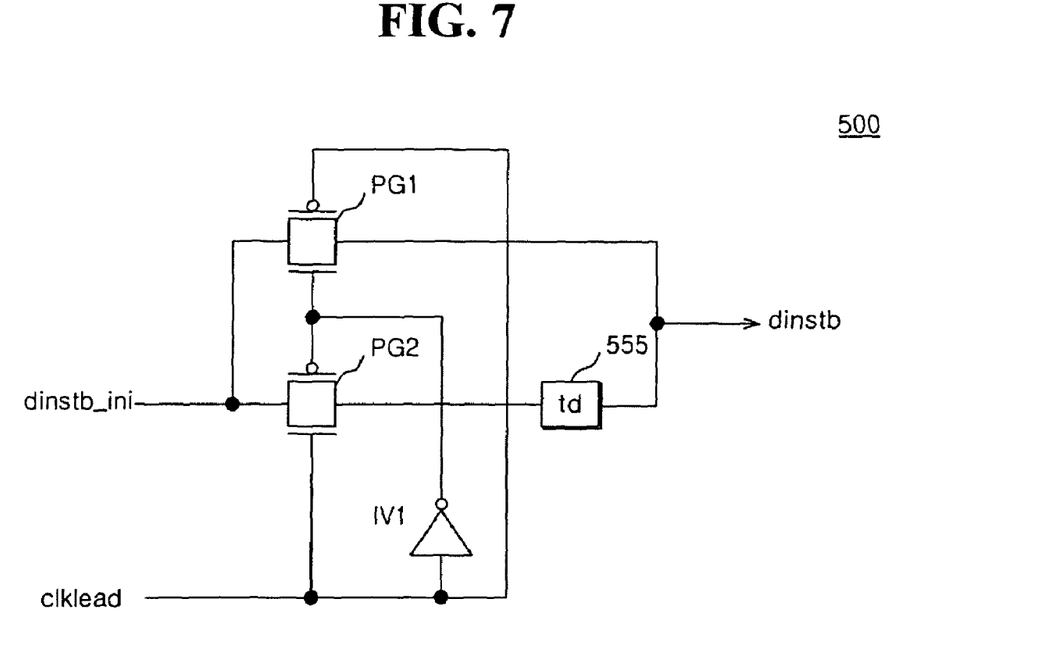
FIG. 7 is a circuit diagram of a first delay controller of FIG. 6.

The first delay controller 500, as shown in FIG. 7, may include a first pass gate PG1 and a second pass gate PG2 controlled by the first phase comparison signal clklead, and a first delay unit 555 connected to an output terminal of the second pass gate PG2. Other switching devices responding to the first phase comparison signal clklead may also be used instead of the first pass gate PG1 and the second pass gate PG2.

When the first phase comparison signal clklead changes to a low level, the first pass gate PG1 of the first delay controller 500 is turned on by the first phase comparison signal clklead and a signal inverted by a first inverter IV1. Accordingly, the first delay controller 500 outputs the first data input strobe signal dinstb_ini as an output signal (i.e., the second data input strobe signal dinstb).

When the first phase comparison signal clklead changes to a high level, the second pass gate PG2 of the first delay controller 500 is turned on by the first phase comparison signal clklead and a signal inverted by the first inverter IV1. Accordingly, the first delay controller 500 outputs the first data input strobe signal dinstb_ini delayed by a predetermined time td by the first delay unit 555 as an output signal (i.e., the second data input strobe signal dinstb).

Figure 8:
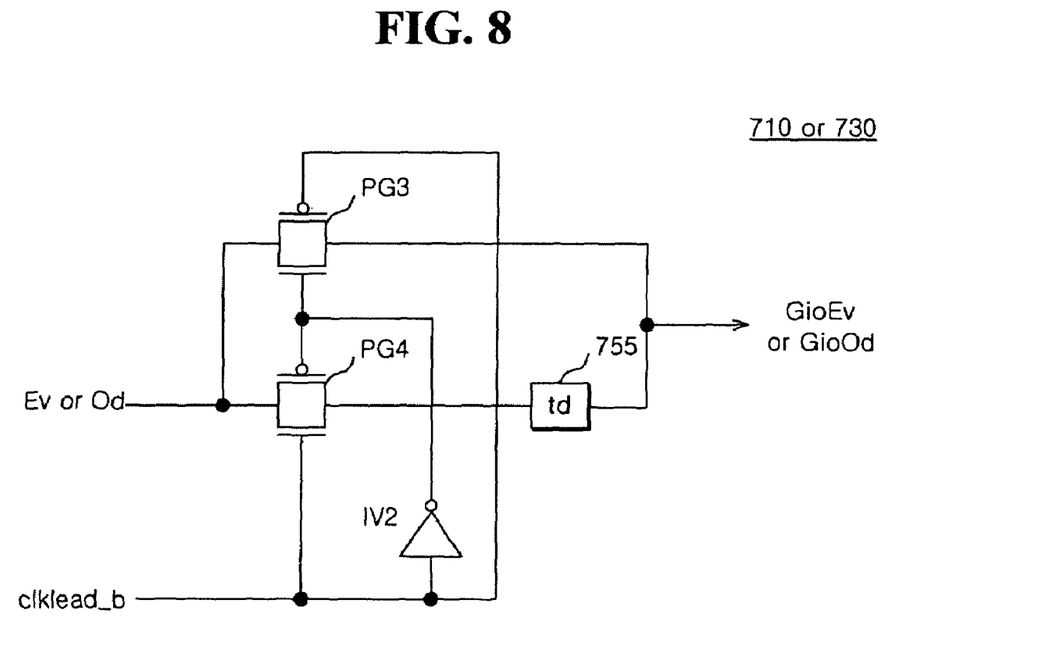
FIG. 8 is a circuit diagram of a first controller and a second controller of FIG. 6.

FIG. 8 is a circuit diagram of the first and second controllers of FIG. 6.

Referring to FIG. 8, each of the first controller 710 and the second controller 730 may include a third pass gate PG3 and a fourth pass gate PG4 controlled by the second phase comparison signal clklead_b, and a second delay unit 755 connected to an output terminal of the fourth pass gate PG4. The third pass gate PG3 and the fourth pass gate PG4 may also be composed of other switching devices controlled by the second phase comparison signal clklead_b.

The third pass gate PG3 of the first controller 710 or the second controller 730 is turned on by the second phase comparison signal clklead_b and a signal inverted by a second inverter IV2 when the second phase comparison signal clklead_b changes to a low level. Accordingly, the first and second controllers 710 and 730 output the first internal output data Ev and the second internal output data Od as the first output data GioEv and the second output data GioOd, respectively. When the second phase comparison signal clklead_b changes to a high level, the fourth pass gate PG4 is turned on by the second phase comparison signal clklead_b and a signal inverted by the second inverter IV2. Accordingly, the first and second controllers 710 and 730 output the first internal output data Ev and the second internal output data Od delayed by a predetermined time td by the second inverter 755 as the first output data GioEv and the second output data GioOd, respectively.

Figure 9:
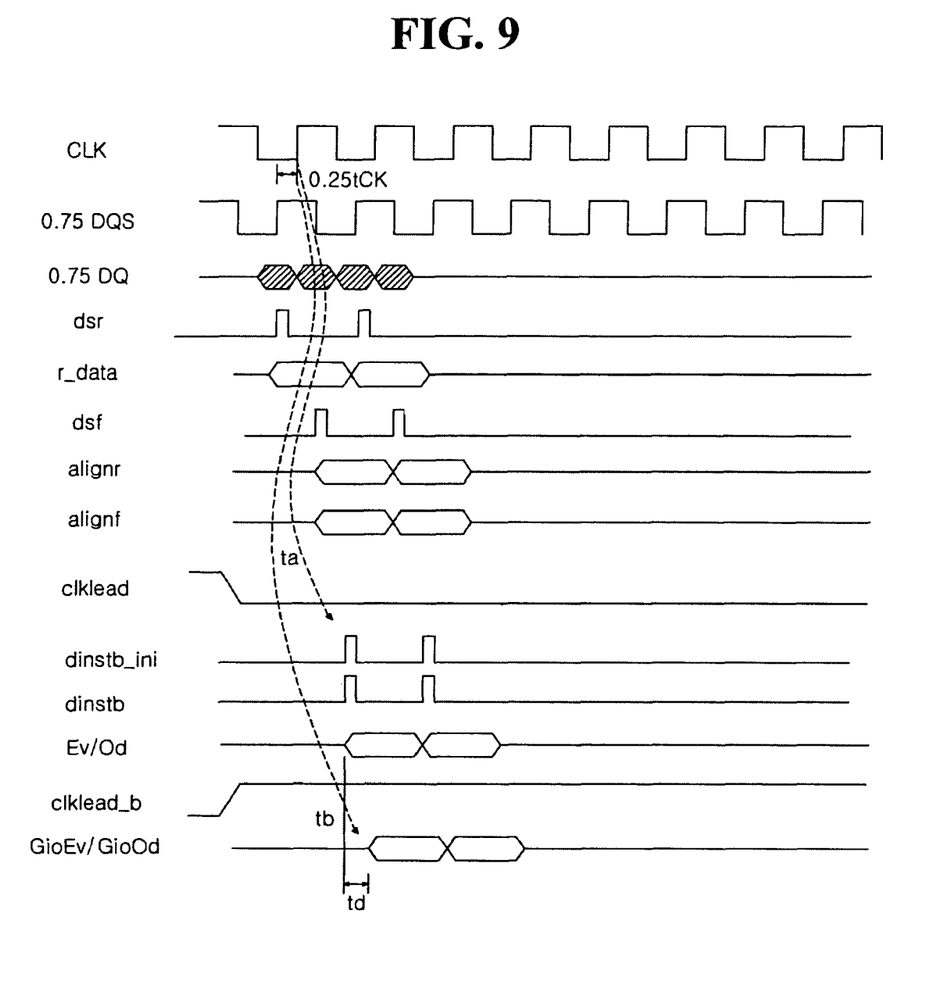
FIG. 9 is a timing diagram illustrating the operation of the data input apparatus when a data strobe signal precedes a clock signal in accordance with an embodiment of the present invention.

FIG. 9 is a timing diagram illustrating the operation of a data input apparatus when the data strobe signal precedes the clock signal.

Referring to FIG. 9, when the data strobe signal DQS leads the clock signal by 0.25tCK, the input data DQ synchronized by the data strobe signal DQS are latched to rising data r_data at the rising edge of the data strobe signal DQS by the first latch circuit 230 driven by the first latch signal dsr. Subsequently, the second latch circuit 250 is driven by the second latch signal dsf, to align the rising data r_data and output the aligned rising data r_data as first aligned data alignr.

The third latch circuit 270 is driven by the second latch signal dsf to latch and align the input data DQ at the falling edge of the data strobe signal DQS and output the aligned signal as second aligned data alignf.

That is, the first aligned data alignr and the second aligned data alignf have the same timing by means of the second latch signal dsf.

The phase detector 400 detects that the data strobe signal DQS leads the clock signal by 0.25tCK, and deactivates the first phase sensing signal clklead to a low level.

The first phase sensing signal clklead of having a low level turns off the first pass gate PG1 disposed in the first delay controller 500. Accordingly, the first data input strobe signal dinstb_ini is output as the second data input strobe signal dinstb without a delay.

The second data input strobe signal dinstb latches the first aligned data alignr and the second aligned data alignf to output them as the first internal output data Ev and the second internal output data Od, respectively.

When the second phase sensing signal clklead_b having an inverted level of the first phase sensing signal clklead is activated to a high level, the fourth pass gate PG4 of each of the first controller 710 and the second controller 730 is turned on. Accordingly, the first internal output data Ev and/or the second internal output data Od are delayed by a predetermined time-td by the second delay unit 755. At that time, the first delayed internal output data Ev and/or the second delayed internal output data Od become the first output data GioEv and/or second output data GioOd, respectively.

Figure 10:
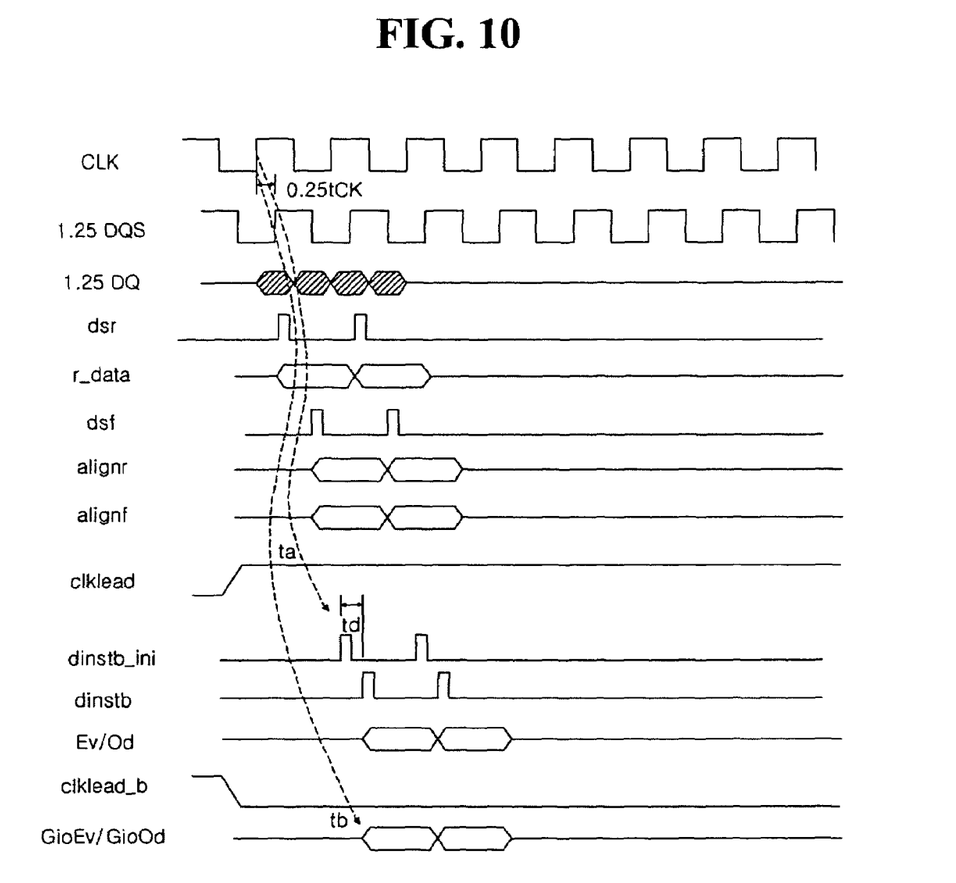
FIG. 10 is a timing diagram illustrating the operation of the data input apparatus when a clock signal lead ahead of a data strobe signal in accordance with an embodiment of the present invention.

FIG. 10 is a timing diagram illustrating the operation of the data input apparatus when a clock signal leads ahead of a data strobe signal.

As shown in FIG. 10, when the clock signal leads the data strobe signal DQS by 0.25tCK, the first latch circuit 230 is driven by the first latch signal dsr so that the input data DQ are latched to rising data r_data at the rising edge of the data strobe signal DQS. In addition, the second latch circuit 250 driven by the second latch signal dsf aligns the rising data r_data to output them as the first aligned data alignr. The third latch circuit 270 driven by the second latch signal dsf latches and aligns the input data DQ at the falling edge of the data strobe signal DQS to output them as the second aligned data alignf.

That is, the first aligned data alignr and the second aligned data alignf have the same timing by means of the second latch signal dsf.

The phase detector 400 detects that the clock signal CLK leads the data strobe signal DQS by 0.25tCK, and activates the first phase sensing signal clklead to a high level. The second pass gate PG2 of the first delay controller 500 is turned on, by the first phase sensing signal having high level clklead. Accordingly, the first delay controller 500 outputs the first data input strobe signal dinstb_ini delayed by a predetermined time td by the first delay unit 555 as the second data input strobe signal dinstb.

The second data input strobe signal dinstb latches the first aligned data alignr and the second aligned data alingf, to output them as the first internal output data Ev and the second internal output data Od, respectively.

When the second phase sensing signal clklead_b having an inverted level of the first phase sensing signal clklead changes to a low level, the third pass gate PG3 of each of the first controller 710 and the second controller 730 is turned off. Accordingly, the first internal output data Ev and the second internal output data Od are output as the first output data GioEv and the second output data GioOd without a delay, respectively.

Figure 11A:
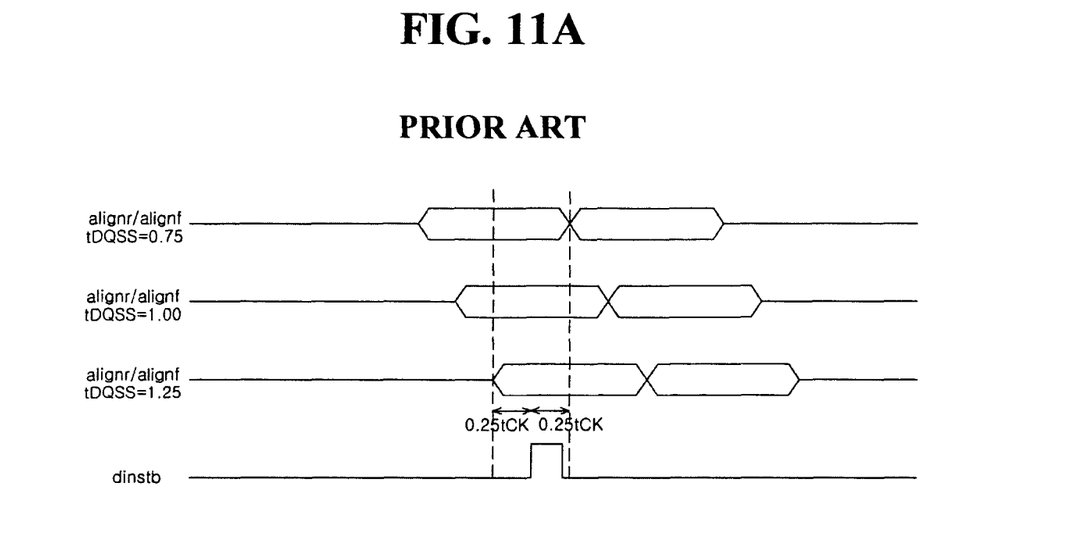
FIG. 11A is a timing diagram illustrating a concept of a conventional data input apparatus of a semiconductor integrated circuit.
Figure 11B:
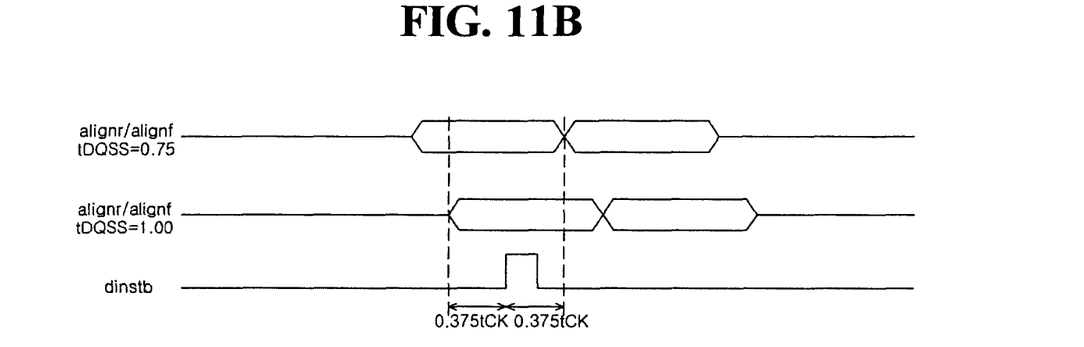
FIGS. 11B and 11C are timing diagrams illustrating a concept of a data input apparatus of a semiconductor integrated circuit in accordance with an embodiment of the present invention.
Figure 11C:
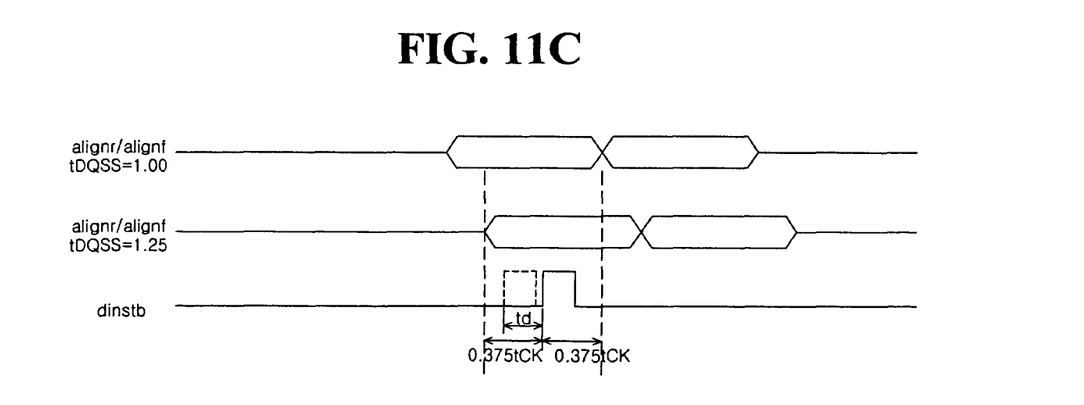

FIG. 11A is a timing diagram illustrating a concept of a conventional data input apparatus of a semiconductor integrated circuit, and FIGS. 11B and 11C are timing diagrams illustrating a concept of a data input apparatus of a semiconductor integrated circuit in accordance with an embodiment of the present invention.

As shown in FIG. 11A, the tDQSS margin of the conventional data input apparatus of the semiconductor integrated circuit corresponds to a portion where the first aligned data alignr and the second aligned data alignf, when the data strobe signal DQS leads ahead of the clock signal CLK (tDQSS=0.75), overlap the first aligned data alignr and the second aligned data alignf when the clock signal leads ahead of the data strobe signal DQS (tDQSS−1.25). When the data strobe signal DQS is exactly synchronized with the clock signal CLK, the second data input strobe signal dinstb is set to be activated at the central portion of the overlapping portion.

That is, the conventional data input apparatus of the semiconductor integrated circuit has the tDQSS margin of ±0.25tCK at both sides of the rising edge as a reference where the second data input strobe signal dinstb is activated.

In contrast, as shown in FIGS. 11B and 11C, the data input apparatus of the semiconductor integrated circuit according to embodiments of the present invention compares the phase of the data strobe signal DQS with the phase of the clock signal CLK to separate the case when the data strobe signal DQS leads the clock signal CLK from the case when the clock signal CLK leads the data strobe signal DQS, so that the tDQSS margin can be secured.

In various embodiments, the second data input strobe signal dinstb is set to be generated at a timing leading, by 0.125tCK, ahead of the center of the first aligned data alignr and the second aligned data alignf synchronizing with the data strobe signal DQS as a reference when the clock signal CLK and the data strobe signal DQS are the exactly same as each other (that is, tDQSS=1).

As shown in FIG. 11B, when the data strobe signal DQS leads the clock signal CLK (i.e., tDQSS=0.75), the first aligned data alignr and the second aligned data alignf synchronizing with the data strobe signal DQS are generated leading 0.25tCK ahead of the case when the data strobe signal DQS and the clock signal CLK are the same as each other (i.e., tDQSS=1).

The first delay controller 500 receiving the first data input strobe signal dinstb_ini outputs the second data input strobe signal dinstb without a delay, so that the second data input strobe signal dinstb has the tDQSS margin of ±0.375tCK.

Alternatively, as shown in FIG. 11C, when the clock signal CLK leads the data strobe signal DQS (i.e., tDQSS=1.25), the first aligned data alignr and the second aligned data alignf synchronizing with the data strobe signal DQS are generated lagging 0.25tCK behind the case when the data strobe signal DQS and the clock signal CLK are the same as each other (i.e., tDQSS=1).

In this case, the second data input strobe signal dinstb, which delays the first data input strobe signal dinstb_ini by the first delay controller 500 after the first delay controller receives the first data input strobe signal dinstb_ini and delays it by a predetermined time td, has the tDQSS margin of ±0.375tCK.

In addition, the output timing of the second data input strobe signal dinstb when the data strobe signal DQS leads the clock signal CLK, and the output timing of the second data input strobe signal dinstb when the clock signal CLK leads the data strobe signal DQS, are different from each other by the predetermined time td. To compensate for the timing difference, the first output data GioEv and the second output data GioOd when the data strobe signal DQS leads the clock signal CLK (that is, tDQSS=0.75) become the first internal output data Ev and the second internal output data Od which are delayed by the predetermined time td, respectively.

As described above, the data input apparatus of the semiconductor integrated circuit according to an embodiment of the present invention compares the phase of the clock signal CLK with the phase of the data strobe signal DQS to output the first phase comparison signal clklead and the second phase comparison signal clklead_b, respectively. In addition, the data input apparatus determines whether the first data input strobe signal dinstb_ini is delayed in response to the first phase comparison signal clklead, and outputs the determined signal as the second data input strobe signal dinstb so that the tDQSS margin can be secured. In addition, the data input apparatus determines whether the first internal output data Ev and the second internal output data Od are delayed in response to the second phase comparison signal clklead_b, and outputs the determined signals as the first output data GioEv and the second output data GioOd so that the output timing can be kept constant.

That is, the data input apparatus and method of the semiconductor memory can improve the tDQSS margin from ±0.5tCK to ±0.75tCK compared to the conventional data input apparatus and method.

According to the data input apparatus and method of the semiconductor memory of embodiments of the present invention, an internal margin of tDQSS can be secured, and an operation of a high speed interface circuit using a strobe signal dedicated for write data can be stabilized to secure a faster circuit operation.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A semiconductor integrated circuit having a data input apparatus, comprising:
    a phase detector configured to compare a phase of a data strobe signal with a phase of a clock signal to output a first phase comparison signal and a second phase comparison signal having an opposite phase of the first comparison signal;
    a first delay controller configured to determine whether a first data input strobe signal will be delayed or not, to output a determined signal as a second data input strobe signal in response to the first phase comparison signal;
    an internal clock synchronizer configured to synchronize a first aligned data and a second aligned data with the clock signal in response to the second data input strobe signal, to output the synchronized first and second data as a first internal output data and a second internal output data, respectively; and
    a second delay controller configured to receive the first internal output data and the second internal output data, determine whether the first internal output data and the second internal output data will be delayed or not, in response to the second phase comparison signal, and output the first internal output data and the second internal output data as a first output data and a second output data, respectively.

2. The semiconductor integrated circuit as set forth in claim 1, further comprising:
    an aligned data generator configured to receive input data and the data strobe signal to output the first aligned data and the second aligned data.

3. The semiconductor integrated circuit as set forth in claim 2, further comprising:
    a command decoder configured to receive the clock signal and a write command signal, to output the first data input strobe signal.

4. The semiconductor integrated circuit as set forth in claim 1, wherein the internal clock synchronizer comprises:
    a first clock synchronizer configured to synchronize the first aligned data with the clock signal, to output the first internal output data in response to the second data input strobe signal; and
    a second clock synchronizer configured to synchronize the second aligned data with the clock signal to output the second internal output data in response to the second data input strobe signal.

5. The semiconductor integrated circuit as set forth in claim 1, wherein the second delay controller comprises:
    a first controller configured to determine whether the first internal output data is delayed or not, to output a determined signal as the first output data in response to the second phase comparison signal; and
    a second controller determining whether the second internal output data is delayed or not, to output a determined signal as the second output data in response to the second phase comparison signal.

6. The semiconductor integrated circuit as set forth in claim 1, wherein the first delay controller comprises a first switching device and a second switching device responding to the first phase comparison signal, the second switching device including an output terminal and a delay unit connected to the output terminal of the second switching device.

7. The semiconductor integrated circuit as set forth in claim 6, wherein the first and second switching devices include input terminals and are configured to receive the first data input strobe signal at their respective input terminals, and the first switching device and the delay unit are connected to a common node.

8. The semiconductor integrated circuit as set forth in claim 7, wherein the first and second switching devices are pass gates.

9. The data input apparatus as set forth in claim 5, wherein each of the first and second controllers comprises a first switching device and a second switching device responding to the second phase comparison signal, the second switching device including an output terminal, and a delay unit connected to the output terminal of the second switching device.

10. The semiconductor integrated circuit as set forth in claim 9, wherein the first and second switching devices include input terminals and the first controller receives the first internal output data at the input terminals of the first and second switching devices, and the first switching device and the delay unit are connected to a common node.

11. The semiconductor integrated circuit as set forth in claim 10, wherein the first and second switching devices are pass gates.

12. The semiconductor integrated circuit as set forth in claim 9, wherein the first and second switching devices include input terminals and the second controller receives the second internal output data at the input terminals of the first and second switching devices, and the first switching device and the delay unit are connected to a second common node.

13. The semiconductor integrated circuit as set forth in claim 12, wherein the first and second switching devices are pass gates.

14. The semiconductor integrated circuit as set forth in claim 2, wherein the aligned data generator comprises:
   a signal distributor configured to receive the data strobe signal, to output a first latch signal and a second latch signal;
   a first latch circuit configured to latch input data in response to the first latch signal, to output rising data;
   a second latch circuit configured to aligning the rising data in response to the second latch signal to output the first aligned data; and
   a third latch circuit configured to latch and align the input data in response to the second latch signal, to output the second aligned data.

15. The semiconductor integrated circuit as set forth in claim 1, wherein when the phase of the clock signal leads the phase of the data strobe signal, the first data input strobe signal is delayed by a predetermined time by the first delay controller and the first and second internal output data are not delayed by the second delay controller, and
   when the phase of the data strobe signal leads the phase of the clock signal, the first data input strobe signal is not delayed by the first delay controller and the first and second internal output data are delayed by the predetermined time by the second delay controller.

16. A method of inputting data input of a semiconductor integrated circuit, comprising:
   providing a first latch signal and a second latch signal synchronized with a data strobe signal, and a first data input strobe signal by decoding a clock signal and a write command signal;
   generating a first aligned data and a second aligned data in response to the first latch signal and the second latch signal;
   comparing a phase of the data strobe signal with a phase of the clock signal, to output a first phase comparison signal and a second phase comparison signal having an opposite phase of the first comparison signal;
   determining whether the first data input strobe signal will be delayed or not in response to the first phase comparison signal resulting from the data strobe signal and the clock signal, to output the first data input strobe signal as a second data input strobe signal;
   outputting the first aligned data and the second aligned data as first internal output data and second internal output data synchronized with the clock signal in response to the second data input strobe signal; and
   determining whether the first internal output data and the second internal output data will be delayed or not in response to the second phase comparison signal, and outputting the first and second internal output data as the first output data and the second output data, respectively.

17. The method as set forth in claim 16, further comprising outputting the first aligned data is when the first latch signal is synchronized at a rising edge of the data strobe signal, and
   outputting the second aligned data when the second latch signal is synchronized at a falling edge of the data strobe signal.

18. The method as set forth in claim 16, further comprising delaying the first data input strobe signal by a predetermined time to generate the second data input strobe signal when the first phase comparison signal is activated.

19. The method as set forth in claim 16, further comprising delaying first internal output data and the second internal output data by a predetermined time to generate the first and second output data when the second phase comparison signal is activated, respectively.

* * * * *